UNITED STATES PATENT OFFICE.

THOMAS C. SMITH, OF BROOKLYN, NEW YORK.

IMPROVEMENT IN COMPOUNDS FOR CLEANING METALS AND FOR OTHER PURPOSES.

Specification forming part of Letters Patent No. 153,123, dated July 14, 1874; application filed March 18, 1874.

*To all whom it may concern:*

Be it known that I, THOMAS C. SMITH, of Brooklyn, in the county of Kings and State of New York, have invented certain new and useful Improvements in Compounds for Cleaning Metals and for other purposes; and I do hereby declare the following to be a full, clear, and exact description of the invention, such as will enable others skilled in the art to which it pertains to make and use it.

My improvement relates to artificial pumice-blocks for the variety of uses for which large pieces of pumice-stone are used. Artisans desire square blocks of pumice-stone for their work, and in order to obtain these there is considerable labor and waste of the stone expended to obtain this form. The natural pumice-stone is not uniform in quality, and therefore for some uses a selection is required out of a mass, to obtain the uniformity and fineness desired. By my improvement small fragments as well as large pieces of pumice-stone are converted into homogeneous blocks of uniform quality, and of any desired fineness, forming a superior stone to the natural product, for the various purposes above referred to.

I first reduce the natural pumice-stone to powder, of fineness varying with the purposes for which it is ultimately designed to be used for. I next mix with this powder a solution of silicate of soda, in such small quantity that the mass appears and feels to the touch but slightly damp. This mixture is placed in molds of iron or other material of the required form, and submitted to pressure by a screw-press. On removal from the mold the powder will cohere together and present a compact body of the form of the mold employed. This block or form is next immersed in a solution of chloride of calcium in water, and allowed to so remain during a time varying with its thickness or magnitude—for a block one inch thick three hours will be sufficient On removing the block from the solution it will be found to have concreted. It is next immersed in water alone, to free it from the soluble salt resulting from the reaction of the silicate of soda and chloride of calcium. This will require a time equal to that of the immersion in the chloride-of-calcium solution. The stone so formed is next gradually dried, when it is ready for use. The stone so formed is nearly pure pumice, as the quantity of silicate of soda employed is so small there is very little silicate of lime resulting, yet sufficient to firmly hold each particle together.

The foregoing will answer, but I prefer the following method of forming my compounds: Take of ground pumice-stone, of the degree of fineness required for any special case, four hundred parts, by weight, and forty parts of dry-slaked lime, thoroughly mixed together through a sieve; then wet with water sufficient for a thin pasty mass. Two hundred parts, by weight, of silicate-of-soda solution (of sixty per cent. strength) is then quickly added and stirred with the pumice and lime. It is then poured into a square metallic mold and allowed to set, which will require about five minutes. A thin knife-blade is then inserted between the mold and the mass around the whole contact, when it is easily removed. It is next set in the shade to dry and shrink slowly, to avoid liability to crack. The next step is to immerse the form in water to remove the free soda resulting from the decomposition of the silicate of soda in the formation of the silicate of lime. This requires about ten hours. The block is next dried, this time more rapidly, if desired, than before. When dried it is immersed in a weak solution of silicate of soda, formed by adding about one pound of the above (sixty per cent. solution) to a gallon of water. It is left in this until all bubbling has ceased; or, in other words, till the pores have become filled, when it is removed and again dried. The next step is to place the form in an oven or kiln, and then heat it for several hours to a temperature of about 1500° Fahrenheit. It is next removed, and when cooled the thin skin or glaze formed on the surface is removed by a grindstone. It then possesses the qualities required of it.

The lime employed is prepared as follows: Stone lime is spread over a floor and allowed to partially air-slake, when it is removed to a tray and slaked with water, after which the unslaked portions are singled out and the lime is sifted into a wooden tank in a pasty condition, where it remains a few days, during which the thin skin of carbonate of lime formed on the surface is occasionally removed. It is next removed from the tank to a drying-room and thoroughly dried, then put in barrels for use.

In some cases the following formula is desirable: Three hundred ground pumice, one hundred ground quartz, forty dry-slaked lime, and two hundred silicate-of-soda solution. The whole process as above described is repeated. The powders are all mixed thoroughly, and the process proceeded with precisely as described when pumice alone is used.

One of the more important uses for these blocks of artificial pumice-stones is for removing old paint from furniture and moldings previous to applying a new coat of paint. It is also used by varnishers for preparing a smooth and finished surface, not only for articles of wood, but also iron, as fire and burglar safes, chests, &c. Its application to scouring of metals is also considerable.

When the pumice-stones are used they are saturated with water and do not "gum up," as it is technically termed—that is, the pores do not become clogged, and thus become choked and polished, so as to prevent their cutting.

What I claim, and desire to secure by Letters Patent of the United States, is—

1. The compound herein described for cleaning metals and for other purposes, made by combining pumice-stone or other similar hard mineral in fine powder, as described, with an alkaline silicate or water-glass, and then treating it with chloride of calcium or other equivalent alkaline earth, or oxide of a metal, to harden and waterproof the mass, substantially as specified.

2. In the manufacture of artificial pumice-stone, the combination of pumice or other cutting or polishing material with prepared lime and silicate of soda, substantially as described.

3. The process of forming artificial pumice, consisting in the several steps of mixing the materials, drying, washing, and baking, substantially as set forth.

In testimony that I claim the foregoing I have hereunto set my hand this 3d day of March, 1874.

THOMAS C. SMITH.

Witnesses:
D. D. PARMELEE,
TIMOTHY PERRY.